US012401254B1

United States Patent
Ji et al.

(10) Patent No.: US 12,401,254 B1
(45) Date of Patent: Aug. 26, 2025

(54) STIFFNESS-VARIABLE JOINT ACTUATOR WITH MOTOR-REDUCER INTEGRATION

(71) Applicant: BEIJING UNIVERSITY OF TECHNOLOGY, Beijing (CN)

(72) Inventors: Shuting Ji, Beijing (CN); Erhao Yuan, Beijing (CN); Yueming Zhang, Beijing (CN); Chiyu Zhang, Beijing (CN); Yonghu Ji, Beijing (CN); Hongju Guang, Beijing (CN); Iijun Xiang, Beijing (CN); Shoubin Chi, Beijing (CN); Tengyue Wei, Beijing (CN); Yiwan Li, Beijing (CN)

(73) Assignee: BEIJING UNIVERISTY OF TECHNOLOGY, Beijing (CN)

( * ) Notice: Subject to any disclaimer, the term of this patent is extended or adjusted under 35 U.S.C. 154(b) by 0 days.

(21) Appl. No.: 18/991,266

(22) Filed: Dec. 20, 2024

Related U.S. Application Data (63) Continuation of application No. PCT/CN2024/100366, filed on Jun. 20, 2024.

(30) Foreign Application Priority Data

May 18, 2023 (CN) .......................... 202310557791.7

(51) Int. Cl.
*F16H 49/00* (2006.01)
*B25J 9/10* (2006.01)
(Continued)

(52) U.S. Cl.
CPC ............ *H02K 7/116* (2013.01); *B25J 9/1005* (2013.01); *F16H 19/08* (2013.01); *H02K 11/215* (2016.01); *H02K 21/22* (2013.01)

(58) Field of Classification Search
CPC .............................. F16H 49/001; H02K 7/116
See application file for complete search history.

(56) References Cited

U.S. PATENT DOCUMENTS

2019/0331199 A1* 10/2019 Cao .......................... F16H 1/32

FOREIGN PATENT DOCUMENTS

| CN | 103075470 A | 5/2013 |
|---|---|---|
| CN | 104669261 A | 6/2015 |

(Continued)

OTHER PUBLICATIONS

International Search Report for PCT/CN2024/100366.
Search Report of the priority application CN202310557791.7.

*Primary Examiner* — Randell J Krug
(74) *Attorney, Agent, or Firm* — J.C. PATENTS (57) ABSTRACT

The present invention discloses a stiffness-variable joint actuator with motor-reducer integration, and belongs to the field of robots. The stiffness-variable joint actuator includes: a torque motor, which includes a casing, a stator, a rotor, pin gears, and pin gear rollers; and a reducer core, which includes cycloidal gears, a planetary carrier, and an eccentric shaft. The motor is connected to a cycloidal-pin gear reducer, thereby achieving the technical effect of enhancing the impact resistance and reverse actuation capability of the actuator. The rotor is disposed outside the stator, the eccentric shaft is connected to the rotor, and the reducer is disposed inside the motor, thereby achieving the technical effect of integrating the motor and the reducer and reducing the axial dimension of the actuator. The cycloidal gears are provided with round holes and special-shaped holes, and the planetary carrier is provided with round dowel pins and special-shaped dowel pins; under a rated load, the round holes are in contact with the round dowel pins, and the special-shaped holes are not in contact with the special-shaped dowel pins; and under a load above the rated load, (Continued)

the round holes and the round dowel pins extrude each other to achieve an allowable deformation, and the special-shaped holes are in contact with the special-shaped dowel pins, thereby achieving the technical effect of changing the stiffness of the actuator.

2 Claims, 9 Drawing Sheets

(51) Int. Cl.
*F16H 19/08* (2006.01)
*H02K 7/116* (2006.01)
*H02K 11/215* (2016.01)
*H02K 21/22* (2006.01)

(56) References Cited

FOREIGN PATENT DOCUMENTS

| CN | 108638118 A | 10/2018 |
| CN | 115163757 A | 10/2022 |
| CN | 116638543 A | 8/2023 |

* cited by examiner

STIFFNESS-VARIABLE JOINT ACTUATOR WITH MOTOR-REDUCER INTEGRATION

CROSS-REFERENCE TO RELATED APPLICATIONS

The present application is a continuation of international application PCT/CN2024/100366 filed on Jun. 20, 2024, which claims the priority benefit to Chinese Patent Application No. 202310557791.7 filed on May 18, 2023. The entire contents of the above identified applications are incorporated herein by reference.

BACKGROUND OF THE INVENTION

1. Technical Field

The present invention discloses a stiffness-variable joint actuator with motor-reducer integration, and belongs to the field of robots. It is characterized by the high integration of the motor and reducer, and variation of stiffness in real time according to the load. This structure can enhance the power density, impact resistance capability and reverse driving ability of the actuator.

2. Description of Related Art

Mobile legged robots can be widely used in outer space exploration, military reconnaissance, wars and conflicts, disaster reliefs and many other environments. As a core module of a mobile legged robot, a joint actuator directly determines the movement balance, stability and disturbance resistance of the robot. Improvement of the power density, impact resistance and reverse actuation capability of the joint actuator can significantly enhance the adaptability and dynamic response capability of the mobile legged robot in a non-structural environment.

A harmonic reducer has the advantages of stable transmission, compact structure and high transmission accuracy, and thus are commonly used at the joints of legged robots. The arrangement is generally as follows: the harmonic reducer is axially connected in series to a motor end to end, and a torque sensor is connected in series at the end of the harmonic reducer. Although this layout can increase the transmission stability, it increases the axial dimension of the actuator and the complexity of the mechanical system, leading to reduced power density of the actuator and compromised accuracy control and dynamic tracking. In addition, compared with other planetary reducers, the harmonic reducer has a large transmission ratio and low transmission efficiency, leading to low reverse actuation capability. In terms of bearing an impact load, the steel gear of the harmonic reducer is meshed with a flexible gear, easily leading to gear breakage. As a result, it cannot bear the impact load acting on the legged robot during the processes of running and jumping.

Another commonly used type of joint reducer is the planetary reducer with involute gear rotation. This reducer has the advantages of high transmission efficiency, strong reverse actuation capability and ease in manufacturing. However, it has the disadvantages of large transmission return error and vibrations that occur during the high-speed running of the legged robot.

However, the cycloidal reducer has compact structure, strong bearing capacity and large transmission ratio range, as well as strong impact resistance compared with the harmonic and planetary reducers. It is applicable to running and jumping of the legged robot in a non-structural environment.

BRIEF SUMMARY OF THE INVENTION

An object of the present invention is to disclose a stiffness-variable joint actuator with motor-reducer integration for the problems of low reverse actuation capability, large axial dimension, low power density and insufficient impact resistance of a current robot joint actuator. The stiffness-variable joint actuator includes:
 a torque motor, which includes a casing, a stator, a rotor, pin gears, and pin gear rollers; and
 a reducer core, which includes two identical cycloidal gears arranged at a phase difference of 180°, an eccentric shaft and a planetary carrier.

In an improved solution, the motor is connected to a reducer with a cycloidal-pin gear transmission, such that the impact resistance, transmission efficiency and reverse driving capability of the actuator are enhanced.

In an improved solution, the stator and the casing are fixed; the rotor is provided with a flange, and permanent magnets are embedded in the flange; and the flange is disposed outside a coil of the rotor to allow for placement of the rotor outside the stator. The eccentric shaft and the rotor are centered via a rabbet and connected via a bolt, and the rotor of the motor rotates to actuate the cycloidal-pin gear reducer. The cycloidal-pin gear reducer is built in the torque motor, such that the axial dimension of the actuator is reduced, the power density is increased, and the high degree of integration and mechanical-electrical integration of the joint actuator are achieved.

In an improved solution, flanks of the two identical cycloidal gears arranged at a phase difference of 180° are provided with round holes and special-shaped holes; and the planetary carrier is provided with round dowel pins and special-shaped dowel pins. In a case where an actual load is below a rated load, the round holes are in contact with the round dowel pins, so as to transmit power; in case of impacts where the actual load is above the rated load, the round holes and the round dowel pins extrude each other to achieve an allowable deformation, and the special-shaped holes start contacting the special-shaped dowel pins to increase the stiffness of the reducer.

The present invention achieves the following technical effects.

1. The cycloidal-pin gear reducer has the advantages of strong impact resistance, high transmission efficiency, compact structure, and wide range of transmission ratio. A cycloidal-pin gear reducer is connected to the motor, which enhances the impact resistance, the transmission efficiency and the reverse actuation capability of the joint actuator.

2. The rotor of the torque motor is disposed outside the stator, the reducer is disposed in the torque motor, and the rotor of the motor is fixedly connected to the eccentric shaft, which reduces the axial dimension of the actuator, eliminates the need of an auxiliary spring encoder, and achieves high degree of integration and enhanced power density for the joint actuator.

3. In the cycloidal-pin gear reducer, the contact mode between the dowel pins of the planetary carrier and the dowel pin holes of the cycloidal gear can be adjusted according to the load torque as follows: during stable operation (i.e., a load is below the rated load), the round dowel pins and the round holes come into contact to transmit power; and under the action of an impact load (i.e., a load is above the rated load), the round dowel pins and the round holes extrude each other to achieve an allowable value, and the special-shaped dowel pins of the planetary carrier and the special-shaped holes of the cycloidal gear come into contact to start transmitting power. By adjusting the contact mode for different dowel pins, the stiffness of the reducer can be changed, and the impact resistance of the joint actuator is improved.

In the figures, reference signs are as follows:
1—torque motor, 11—casing, 111—feedback sensor, 12—stator, 121—coil, 13—rotor, 131—flange, 132—permanent magnet, 133—magnetic element, 14—pin gear, 15—pin gear roller, 2—reducer core, 21—cycloidal gear, 211—round hole, 212—special-shaped hole, 22—eccentric shaft, 23—planetary carrier, 231—round dowel pin, 232—special-shaped dowel pin.

DETAILED DESCRIPTION OF THE INVENTION

The present invention will be explained in details below in conjunction with the accompanying drawings.

The present invention and the embodiments thereof are described in a non-limiting way below, and the actual embodiments are not limited thereto. In brief, those structure modes and embodiments which are similar to the present technical solution and are designed without inventiveness by those of ordinary skills in the art under the inspiration of the embodiment above without departing from the inventive principle of the present invention shall fall under the protection scope of the present invention.

Figure 1:
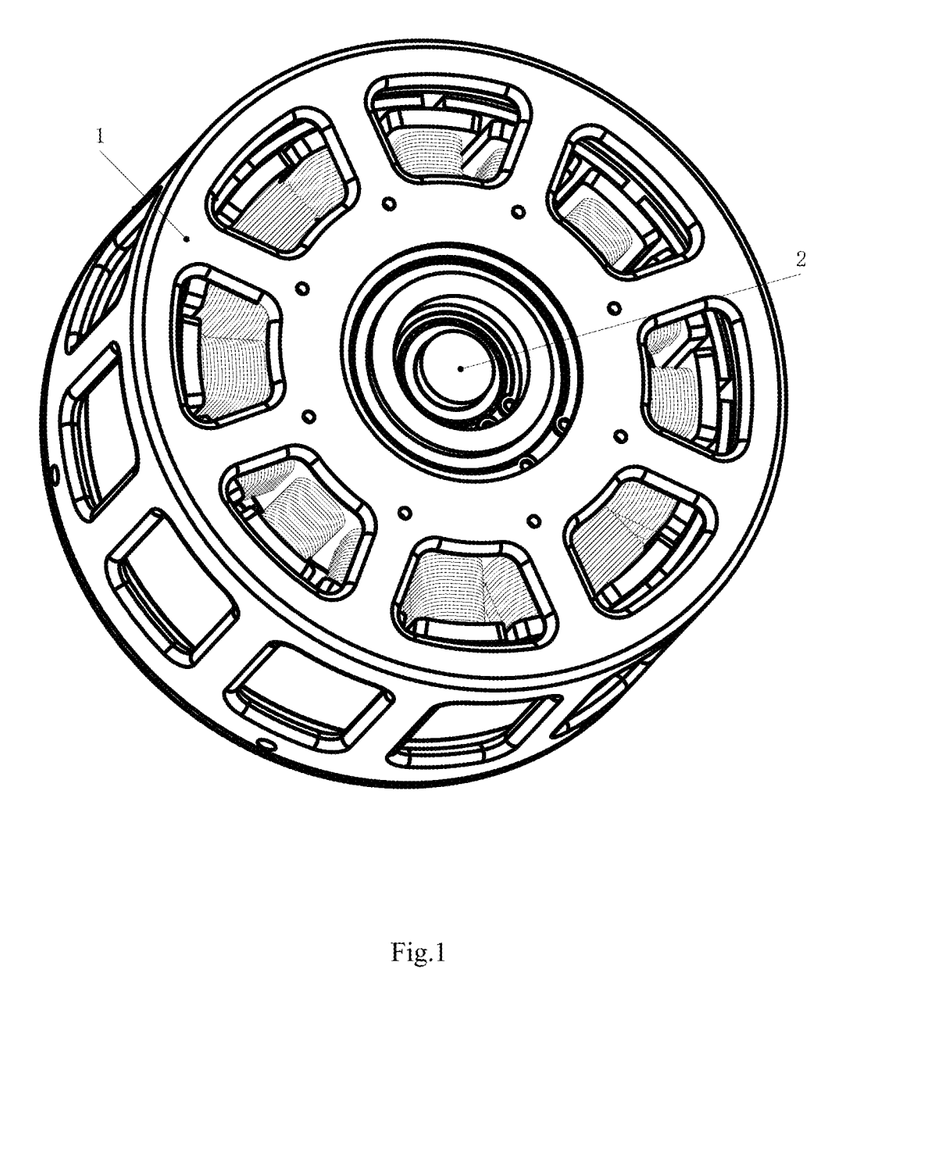
FIG. 1 is a schematic axonometric view of a stiffness-variable joint actuator with motor-reducer integration according to the present invention.

As shown in FIG. 1, a specific embodiment of the present invention discloses a stiffness-variable joint actuator with motor-reducer integration, which can be used in the field of robots and the like.

Figure 2:
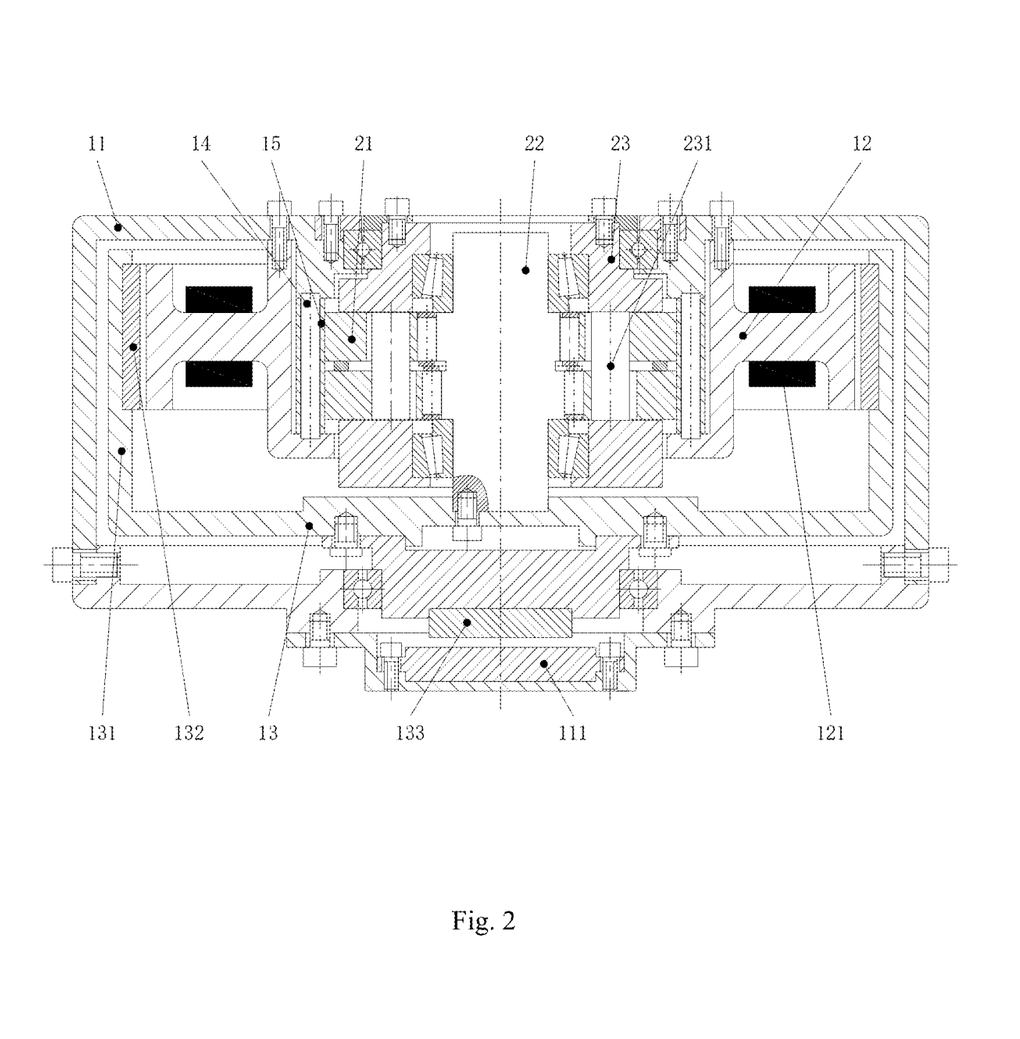
FIG. 2 is a schematic diagram showing components and assembling of the stiffness-variable joint actuator with motor-reducer integration according to the present invention.

In a preferred embodiment, an assembling relationship is shown in FIG. 2.

Figure 3:
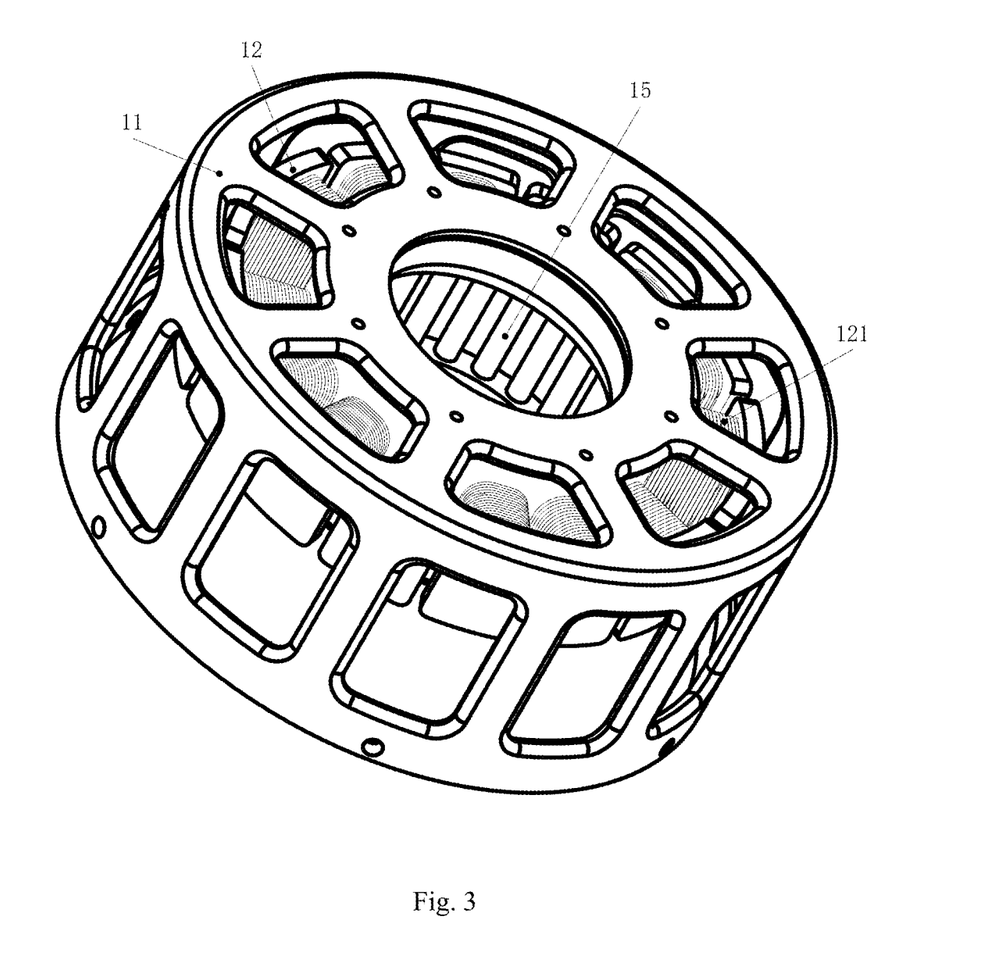
FIG. 3 is a schematic axonometric view of an upper portion of a torque motor.
Figure 4:
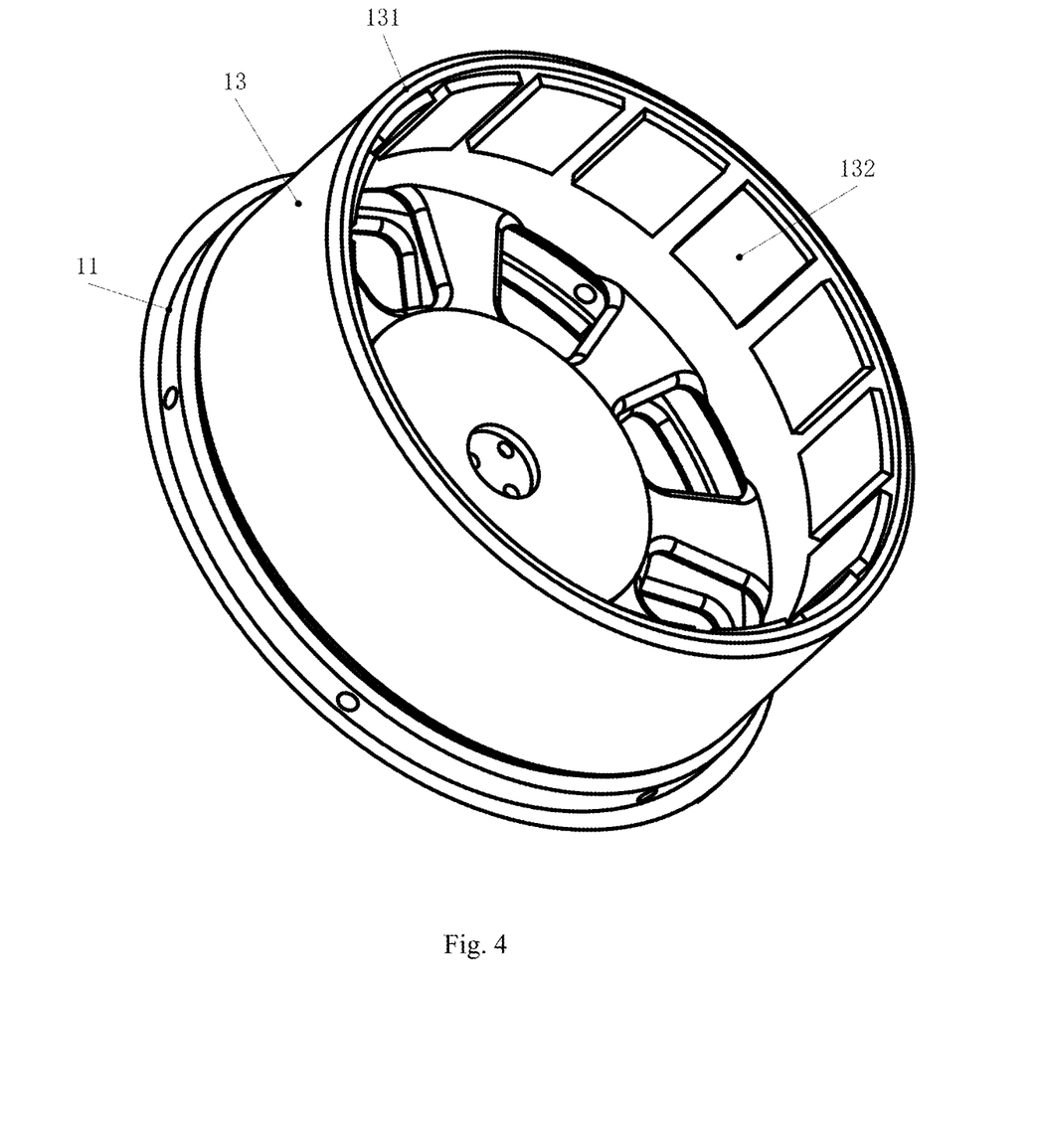
FIG. 4 is a schematic axonometric view of a lower portion of a torque motor.

A casing 11 is formed by connecting and splicing upper and lower portions via bolts. The stator 12 and the upper portion of the casing 11 are fixed via bolts, a coil 121 is wound on the stator 12, pin gears 14 are disposed between the stator 12 and the casing 11, pin gear roller 15 is sleeved outside the pin gear 14, as shown in the axonometric view in FIG. 3; and the rotor 13 is connected to the lower portion of the casing 11 via a bearing, as shown in the axonometric view in FIG. 4. After the coil of the stator is energized, the rotor may rotate relative to the stator; a magnetic element 133 is embedded in a shaft end of the rotor 13; a feedback sensor 111 fixed to the casing 11 can sense the rotation speed and position of the magnetic element 133, thereby transmitting motor information into a motor controller to control the rotation of the motor.

Figure 5:
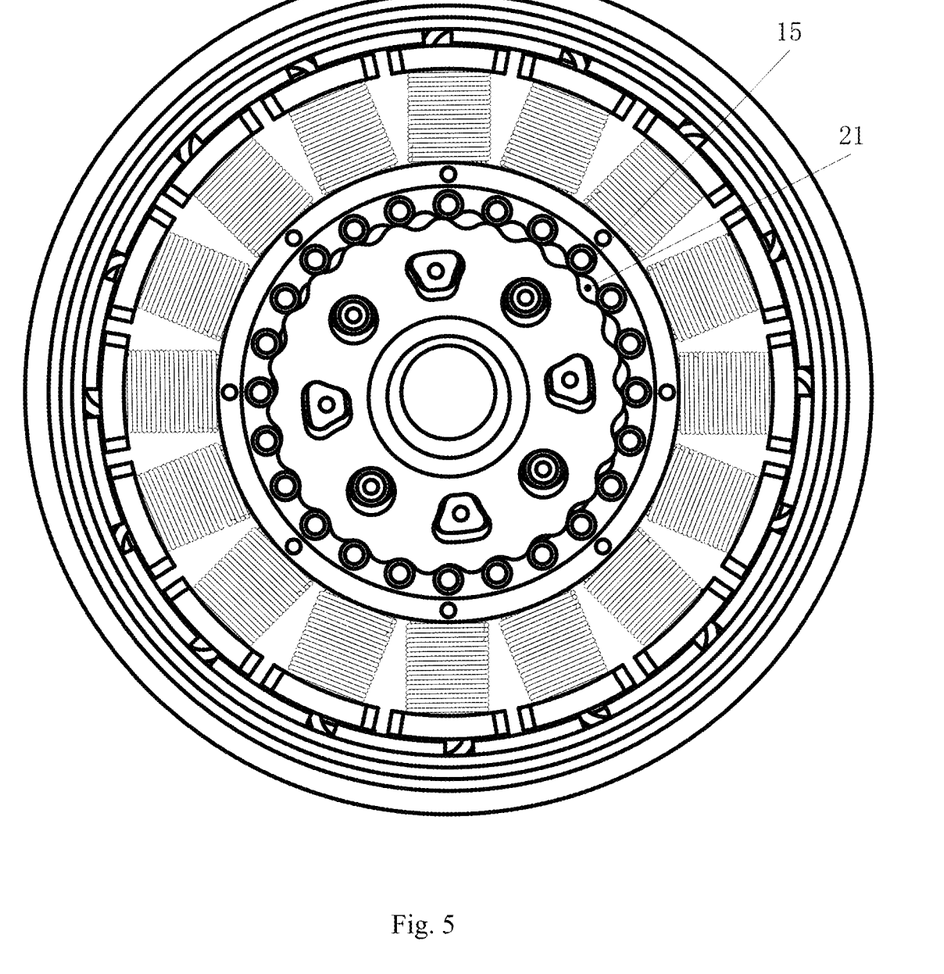
FIG. 5 is a schematic diagram showing that cycloidal gears are meshed with pin gear rollers.

The eccentric shaft 22 is connected to the rotor 13 via bolts, and the cycloidal gears 21 are meshed with the pin gear roller 15 in a pattern as shown in FIG. 5. The power can be transmitted into the reducer from the motor, such that the high degree of integration between the motor and the cycloidal gear reducer is achieved, the motor-reducer integration is achieved, and the axial dimension of the joint actuator is reduced.

Figure 6:
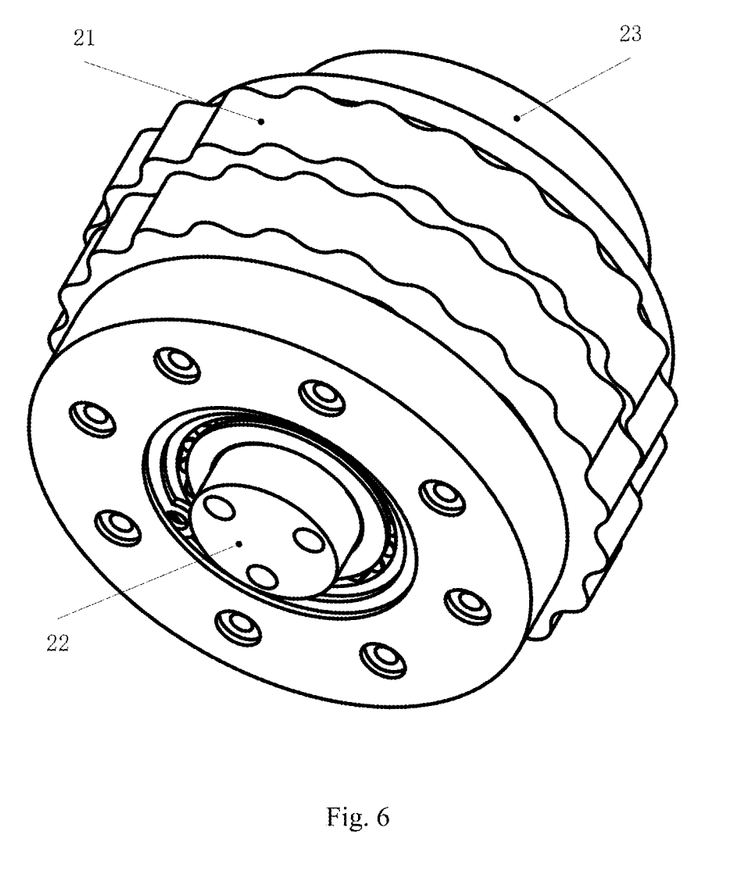
FIG. 6 is a schematic axonometric view of a reducer core.
Figure 7:
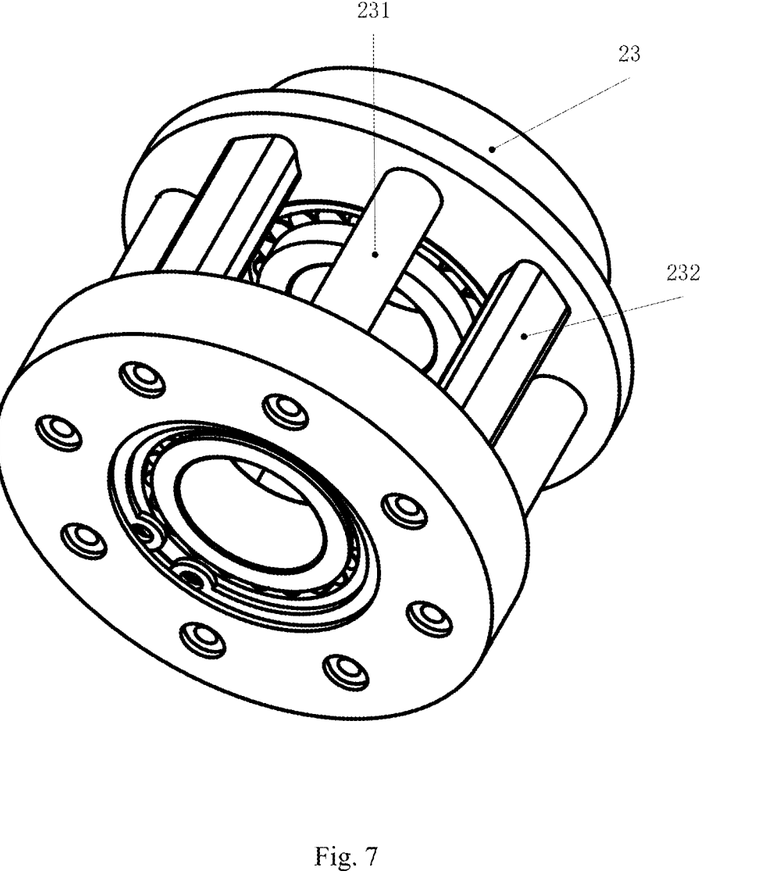
FIG. 7 is a schematic axonometric view of a planetary carrier.
Figure 8:
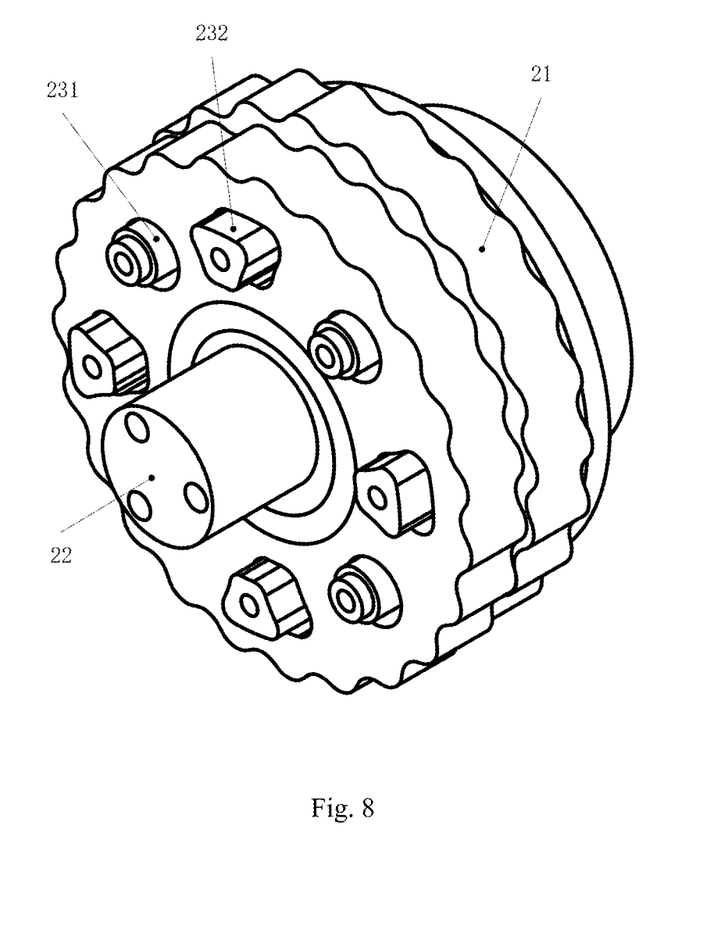
FIG. 8 is a schematic axonometric view showing that dowel pins of the planetary carrier are matched with dowel pin holes in flanks of the cycloidal gears.

The axonometric view of the reducer core 2 is shown in FIG. 6; the cycloidal gears 21 are sleeved on the eccentric shaft 22 via a needle roller bearing; the upper and lower parts of the planetary carrier 23 are connected together via bolts, as shown in an axonometric view in FIG. 7; the planetary carrier 23 is sleeved on the eccentric shaft 22 via a conical roller; the dowel pins on the planetary carrier 23 pass through the corresponding dowel pint holes in the cycloidal gears 21, as shown in FIG. 8. After the cycloidal gears meshes with the pin gear rollers, the cycloidal gears undergoes self rotation to drive the plane carrier to rotate by means of the dowel pins.

Figure 9:
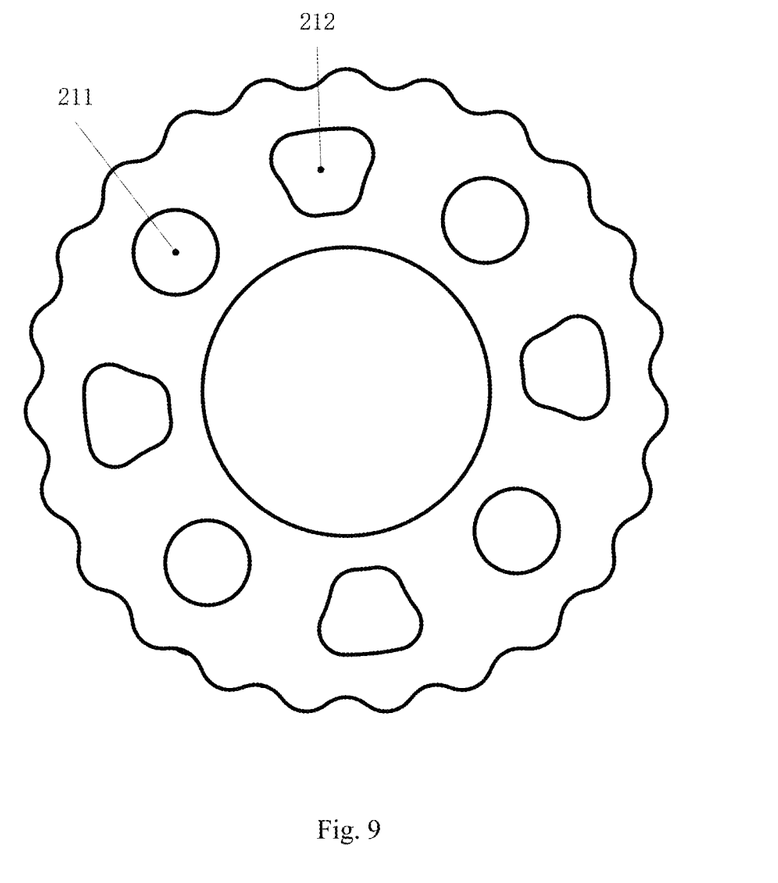
FIG. 9 is a schematic diagram of the cycloidal gear.

As shown in FIG. 7, the planetary carrier 23 is provided with four round dowel pins 231 and four special-shaped dowel pins 232. As shown in FIG. 9, the flanks of the cycloidal gears 21 are provided with four round holes 211 and four special-shaped holes 212. Moreover, the round profile of each round dowel pin and the round profile of each round hole are equidistant curves at a distance equal to the eccentric distance of the cycloidal gear; likewise, the profile of each special-shaped dowel pin and the profile of each special-shaped hole are also equidistant curves at a distance equal to the sum of the eccentric distance and the deformation amount of the round dowel pin under the rated load. During the operation of the joint actuator, in a case where a load is lower than the rated load, the special-shaped holes do not in contact with the special-shaped dowel pins, and the self rotation of the cycloidal gears are transmitted via the contact between the round holes 211 and the round dowel pins 231; in a case where a load is above the rated load, the round holes and the round dowel pins extrude each other to produce the maximum deformation (i.e., achieving the allowable deformation amount), the special-shaped holes and the special-shaped dowel pins then come into contact, and at this point, the torque of the motor is transmitted jointly by allowing for contact between the round holes and the round dowel pins and contact between the special-shaped holes and the special-shaped dowel pins. Under different load conditions, the dowel pins of the planetary carrier and the cycloidal gears contact in different ways, thereby changing the stiffness of the joint actuator.

According to the present invention, the motor is connected to the cycloidal-pin gear reducer, allowing for a more compact structure of the joint actuator and increasing the impact resistance, transmission efficiency and reverse driving capability of the joint actuator. The rotor of the torque motor is disposed outside the stator, and the reducer is disposed in the torque motor, and the rotor of the motor is fixedly connected to the input shaft of the reducer, such that the axial dimension of the actuator is reduced, the need for an auxiliary spring encoder is eliminated, and the high degree of integration and enhanced power density are achieved for the joint actuator. In the cycloidal-pin gear reducer, the contact mode between the dowel pins of the planetary carrier and the dowel pin holes of the cycloidal gear can be adjusted according to the load torque as follows: during stable operation (i.e., a load is below the rated load), the round dowel pins and the round holes come into contact to transmit power; and under the action of an impact load (i.e., a load is above the rated load), the round dowel pins and the round holes extrude each other to achieve an allowable value, and the special-shaped dowel pins of the planetary carrier and the special-shaped holes of the cycloidal gear come into contact to start transmitting power. By adjusting the contact mode for the dowel pins, the stiffness of the reducer can be changed, which enhances the impact resistance of the joint actuator.

What is claimed is:

1. A stiffness-variable joint actuator with motor-reducer integration, comprising:
    a torque motor (1), which comprises a casing (11), a stator (12), a rotor (13), pins (14) and pin rollers (15), wherein a feedback sensor (111) is fixed onto the casing (11), a coil (121) is wound on the stator (12), the rotor (13) is provided with a flange (131), permanent magnets (132) are embedded in the flange (131), and a magnetic element (133) is embedded in a shaft end of the rotor (13); and
    a reducer core (2), which comprises two identical cycloidal gears (21) arranged at a phase difference of 180°, an eccentric shaft (22) and a planetary carrier (23), wherein flanks of the cycloidal gears (21) are provided with round holes (211) and non-circular holes (212), and the planetary carrier (23) is provided with round dowel pins (231) and non-circular dowel pins (232);
    wherein the stator (12) is fixedly connected to the casing (11) via bolts, the pins (14) are disposed between the stator (12) and the casing (11), and the pin rollers (15) are sleeved on the pins (14);
    a cavity is disposed outside the stator (12) and inside the casing (11), and the flange (131) and the permanent magnets (132) on the rotor (13) are accommodated in the cavity to enable placement of the rotor outside the stator;
    the shaft end of the rotor (13) is connected to the casing via a bearing;
    in the reducer core (2), a needle roller bearing is inserted into center holes of the two identical cycloidal gears (21) and sleeved on the eccentric shaft (22);
    the planetary carrier (23) is assembled by connecting upper and lower parts through bolts;
    the round dowel pins (231) and the non-circular dowel pins (232) on the planetary carrier (23) correspondingly pass through the round holes (211) and the non-circular holes (212) in the flanks of the cycloidal gears (21) respectively, and a center hole of the planetary carrier (23) is sleeved on the eccentric shaft (22) via a conical roller bearing;
    the cycloidal gears (21) of the reducer core (2) are meshed with the pin rollers (15) sleeved on the pins (14) inside the torque motor (1);
    the rotor (13) and the eccentric shaft (22) are centered via a hole and fixedly connected via a bolt, thereby transmitting a rotor rotation of the motor to the reducer core;
    wherein when the actuator is subject to a load below a rated load, the round dowel pins (231) on the planetary carrier (23) pass through and are in contact with the round holes (211) in the two cycloidal gears (21), and the non-circular dowel pins (232) on the planetary carrier pass through and are without contact with the non-circular holes (212) in the two cycloidal gears;
    wherein when the actuator is subject to a load above the rated load, the round dowel pins (231) on the planetary carrier (23) pass through and deform the round holes (211) in the cycloidal gears (21) to achieve an allowable deformation, and the non-circular dowel pins (232) on the planetary carrier pass through and start contacting the non-circular holes (212) in the two cycloidal gears; and
    wherein a stiffness of the actuator is varied by changing a contact mode between the dowel pins on the planetary carrier and the dowel pin holes in the flanks of the cycloidal gears.

2. The stiffness-variable joint actuator with motor-reducer integration according to claim 1, wherein the magnetic element (133) is fixedly connected to and embedded into the shaft end of the rotor (13) via bolts; and
    the feedback sensor (111) fixed to the casing (11) via a bolt can sense a rotation speed and a position of the magnetic element (133) to transmit motor information to a motor controller, thereby controlling the rotation of the motor.

* * * * *